US012321232B2

(12) United States Patent
Mienkina et al.

(10) Patent No.: US 12,321,232 B2
(45) Date of Patent: Jun. 3, 2025

(54) MEMORY CONTROLLER WHICH IMPLEMENTS PARTIAL WRITES WITH ERROR SIGNALING

(71) Applicant: NXP USA, Inc., Austin, TX (US)

(72) Inventors: Martin Mienkina, Bystrice Nad Olsi (CZ); Quyen Pho, Pflugerville, TX (US); Avni Arora, Delhi (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/480,992

(22) Filed: Oct. 4, 2023

(65) Prior Publication Data
US 2024/0370334 A1  Nov. 7, 2024

(30) Foreign Application Priority Data

May 3, 2023 (IN) .............................. 202311031537

(51) Int. Cl.
*G06F 11/10* (2006.01)
*G06F 11/00* (2006.01)
*G06F 11/07* (2006.01)
*G06F 13/16* (2006.01)

(52) U.S. Cl.
CPC ...... *G06F 11/1068* (2013.01); *G06F 11/0787* (2013.01); *G06F 13/1673* (2013.01)

(58) Field of Classification Search
CPC ............. G06F 11/1068; G06F 11/0787; G06F 13/1673; G06F 11/1044; G06F 3/0653; G06F 11/1012; G06F 11/108; G06F 11/1048; G06F 11/1076; H03M 13/356; H03M 13/35; H03M 13/3776; H03M 13/19; G11C 11/5628; G11C 5/04; G11C 11/1675; G11C 7/1006; G11C 7/22; G11C 2207/2263; G11C 2207/229

See application file for complete search history.

(56) References Cited

U.S. PATENT DOCUMENTS

| | | | |
|---|---|---|---|
| 6,460,114 B1 | 10/2002 | Jeddelloh | |
| 6,718,444 B1 | 4/2004 | Hughes | |
| 7,543,220 B2* | 6/2009 | Honda | ................ G06F 11/1044 |
| | | | 714/755 |
| 8,862,806 B2 | 10/2014 | Yoon et al. | |
| 9,070,378 B2* | 6/2015 | Poudyal | ................... G11B 5/09 |
| 9,354,970 B2* | 5/2016 | La Fetra | ................ G06F 11/10 |

(Continued)

*Primary Examiner* — Justin R Knapp
(74) *Attorney, Agent, or Firm* — Joanna G. Geld (57) ABSTRACT

A requestor of a data processing system provides read access requests, full write access requests with corresponding full write data each having a full-width data size, and partial write access requests with corresponding partial write data each having a partial-width data size onto a system interconnect. A memory array stores write data and corresponding error correction code (ECC) check bits in response to write access requests and provides read data and corresponding ECC check bits for the read data in response to read access requests. A memory controller executes a read-modify-write (RMW) sequence between a store buffer and the memory array to implement a partial write transaction in response to a partial write access request, in which the memory controller stores the partial write data into the store buffer upon receiving the partial write access request and suppresses signaling of ECC errors to the requestor during the RMW sequence.

20 Claims, 5 Drawing Sheets

(56) References Cited

U.S. PATENT DOCUMENTS

| | | | |
|---|---|---|---|
| 9,423,972 B2* | 8/2016 | Welker | G06F 3/0659 |
| 9,898,362 B2 | 2/2018 | Lunadier | |
| 10,372,531 B2* | 8/2019 | Prathapan | H03M 13/356 |
| 10,698,810 B2 | 6/2020 | Byun | |
| 10,838,808 B2* | 11/2020 | Prathapan | G06F 11/1076 |
| 11,237,905 B2* | 2/2022 | Chachad | G06F 3/0673 |
| 11,327,836 B1 | 5/2022 | Wu et al. | |
| 2004/0163027 A1 | 8/2004 | MacLaren et al. | |
| 2006/0090044 A1 | 4/2006 | Hillier, III et al. | |
| 2007/0186135 A1 | 8/2007 | Flachs et al. | |
| 2013/0007574 A1 | 1/2013 | Langadi et al. | |
| 2016/0139837 A1 | 5/2016 | Welker et al. | |
| 2017/0161143 A1* | 6/2017 | Reed | G11C 11/4087 |
| 2017/0235632 A1 | 8/2017 | Healy et al. | |
| 2024/0303196 A1* | 9/2024 | Lee | G06F 3/0659 |

\* cited by examiner

FIG. 6

MEMORY CONTROLLER WHICH IMPLEMENTS PARTIAL WRITES WITH ERROR SIGNALING

CROSS-REFERENCE TO RELATED APPLICATIONS

This application claims the priority under 35 U.S.C. § 119 of India application No. 202311031537, filed on 3 May 2023, the contents of which are incorporated by reference herein.

BACKGROUND

Field

This disclosure relates generally to memory controllers, and more specifically, to a memory controller which implements partial writes with error signaling.

Related Art

Devices such as microcontrollers and microprocessors are designed with increasing complexity, integrating more cores, memories, peripherals, and bus interconnects. Device safety within these devices is supported by various safety elements such as integrity checker, error correction and detection modules, error collection units, etc. These safety elements are integral parts of the device, in which some can be placed within requester-responder paths or peripherals, thereby impacting latencies of read/write transactions. This is especially problematic in the case of a memory controller which implements error correcting code (ECC) and executes partial writes, which require an atomic read-modify-write (RMW) sequence. The use of RMWs for partial writes increases the total number of writes to memory, therefore, any additional latency along the write paths reduces write throughput to the memory, adversely impacting performance of the entire device. Therefore, a need exists for improved implementation of partial writes supporting precise error signaling.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In accordance with one aspect, a memory controller is configured to execute partial writes with ECC, in which ECC errors are signaled to the requestor during read transactions initiated by a requestor while ECC error signaling is suppressed during partial writes. In this manner, ECC signaling signals precise ECC errors to the requester when needed, with reduced latency and without impacting device safety. In one embodiment, during execution of a partial write with a RMW sequence, rather than completing the partial write and signaling any ECC error after the RMW sequence, ECC error signaling is suppressed and the partial write is terminated early, prior to completion of the RMW sequence. The early termination of the partial write allows the requester to proceed with other transactions to the same responder (e.g. the memory controller) or to other responders, and prevents imprecise error flags due to the RMW sequence of the partial write. With ECC error signaling suppressed during performance of a partial write, ECC error signaling is instead performed, as needed, upon subsequent read requests received from a requestor. In this manner, precise error flags are indicated at the time the erroneous data is accessed in response to the received read requests. In one embodiment, during a RMW sequence, any single-bit error is corrected, but any uncorrectable (e.g. double-bit) error is detected and stored such that it can be properly signaled to the requestor at some point after termination of the partial write transaction, when a read of the uncorrectable data is requested.

Figure 1:
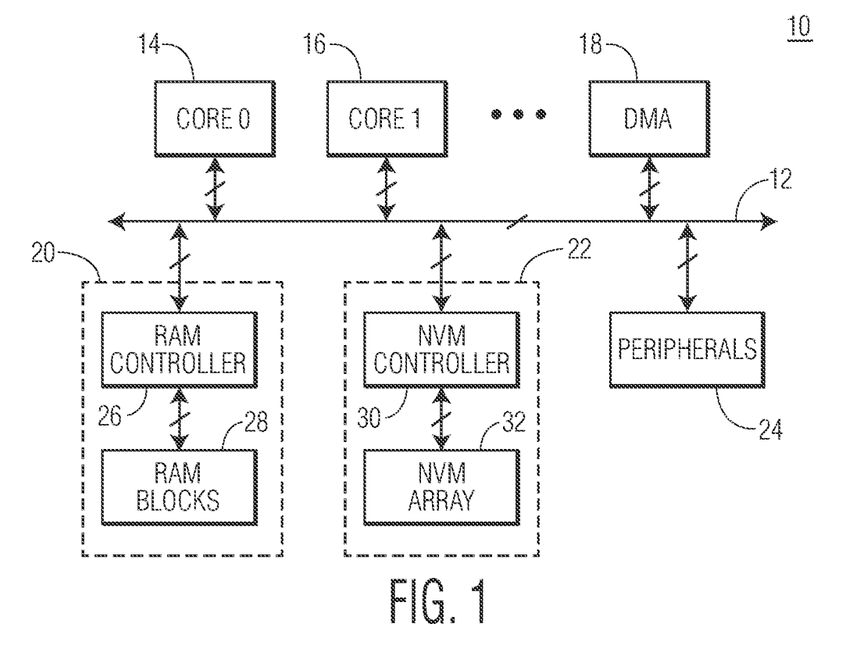
FIG. 1 illustrates, in block diagram form, a data processing system in accordance with one embodiment of the present invention.

FIG. 1 illustrates, in block diagram form, a data processing system 10 in accordance with one embodiment of the present invention. System 10 can be implemented as a System on a Chip (SoC) and may therefore also be referred to as SoC 10 or integrated circuit (IC) 10. In one embodiment, system 10 is implemented as a multiple core (multi-core) system having any number of cores, including, e.g., core 0 14, core 1 16, etc. System 10 may also include a direct memory access (DMA) controller 18. Any of the cores, as well as the DMA controller, can be referred to as a requestor which requests read or write access to any responders in system 10. In one embodiment, system 10 includes memories 20 and 22 and peripherals 24, any of which can be a responder to requests from any of the requestors. Each of cores 14, 16, DMA controller 18, memories 20 and 22, and peripherals 24 are coupled to each other via a system interconnect 12. In one embodiment, system interconnect 12 is implemented as a system bus, but alternatively, can be implemented with any type of interconnect, such as, for example, a crossbar switch, an interconnect fabric, or the like. Also, system 10 can include different, fewer, or additional elements, each of which can either be a requester or responder (or both) of system 10.

In the illustrated embodiment, memory 20 is implemented as a random access memory (RAM), such as, e.g., a static RAM (SRAM), including a RAM controller 26 coupled to one or more RAM blocks 28, and memory 22 is implemented as a non-volatile memory (NVM) including an NVM controller 30 coupled to an NVM array 32. Therefore, any memory in system 10 may include a memory controller (e.g. 26 and 30) coupled with a memory array (e.g. 28 and 32). Peripherals 24 can include any type of peripheral, such as one or more additional memories, input/output (I/O) devices, communication interfaces, etc. The embodiments of FIGS. 2-6 will be discussed primarily with respect to memory 20, including RAM controller 26 and RAM blocks

28. However, in alternate embodiments, the embodiments can apply analogously to a different memory or responder of system 10.

Figure 2:
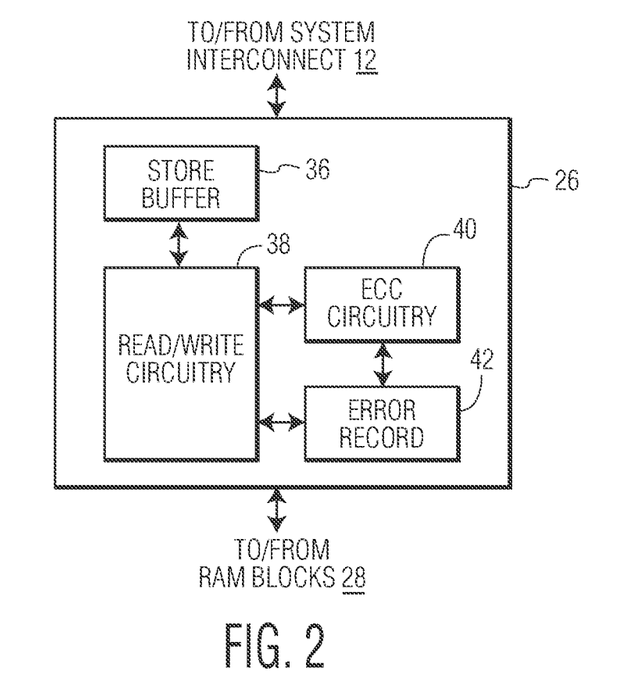
FIG. 2 illustrates, in block diagram form, a memory controller of the data processing system of FIG. 1, in accordance with one embodiment of the present invention.

FIG. 2 illustrates, in block diagram form, a more detailed version of RAM controller 26, in accordance with one embodiment of the present invention. Controller 26 includes read/write circuitry 38 which is capable of performing reads from RAM blocks 28 and writes to RAM blocks 28. Controller 26 also includes a store buffer 36, ECC circuitry 40, and an error record 42 bidirectionally coupled with read/write circuitry 38. In one embodiment, upon a write request (including a write access address and write data) received by RAM controller 26 from a requestor of system 10, the write data is stored in store buffer 36 until RAM blocks 28 is ready to receive the write data for storage at the write access address. Therefore, once RAM blocks 28 is ready to receive the write data, the write circuitry of read/write circuitry 38 provides the write data to RAM blocks 28.

In the illustrated embodiment, store buffer 36 includes storage circuitry configured to store write data, as needed, for write accesses to RAM blocks 28. In one embodiment, store buffer 36 can be implemented as a first in first out (FIFO) storage element. In one embodiment, in response to a read request (including a read access address) received by RAM controller 26 from a requestor of system 10, store buffer 36 is also configured to store read data received from RAM blocks 28 until interconnect 12 is ready to communicate the read data back to the requestor.

ECC circuitry 40 implements an ECC scheme which performs single-bit error correction and double-bit error detection (SECDED), as known in the art. In one embodiment, the full-width data size stored by RAM blocks 28 of memory 20 is 64 bits, in which the full-width data size is the maximum bit size of data which can be read with each read access cycle and written with each write cycle. For example, if the full-width data size of memory 20 is 64 bits, a full width read operation (i.e. a full read) reads or loads the full-width data size of 64 bits in each read access cycle from RAM blocks 28 and a full width write operation (i.e. a full write) writes or stores the full-width data size of 64 bits in each write access cycle to RAM blocks 28. In this embodiment, for each 64-bit data stored in RAM blocks 28, eight bits of ECC check bits are generated by ECC circuitry 40 and stored with the 64-bit data. Similarly, for a read of each 64-bit data from RAM blocks 28, the corresponding ECC check bits are also read. ECC circuitry 40 performs an ECC check for each read by generating ECC check bits on the 64-bit read data and comparing the generated ECC check bits to the ECC check bits received with the read data. In the case of single-bit errors for reads or writes, ECC circuitry 40 performs the bit correction on the 64-bit write data or read data using the corresponding ECC check bits. In the case of double-bit errors, though, ECC circuitry 40 can flag an error, but is not capable of correcting the double-bit errors. For example, as will be described in more detail below, error record 42 may be configured to store the locations in RAM blocks 28 which include one or more double-bit data errors (or otherwise uncorrectable errors).

Note that ECC circuitry 40 can be implemented as known in the art for reads and writes of the full-width data size stored by RAM blocks 28. Also, in alternate embodiments, the full-width data size stored by RAM blocks 28 may be more or fewer than 64 bits, such as 128 bits or 32 bits, in which the larger the full-width data size, the more ECC check bits are needed to provide the SECDED scheme. In other embodiments, an ECC scheme which is able to correct more than single-bit errors (which may, for example, correct a two-bit error) can also be implemented, however, such an ECC scheme takes more time to implement and also requires more check bits. Note also that the ECC check bits corresponding to read data or write data can be referred to as an ECC code word. Read/write circuitry 38 can be implemented, as known in the art, to perform reads from RAM blocks 28 and perform writes to RAM blocks 28. For example, read/write circuitry 38 may include, for example, control circuitry, row and column decoders, multiplexors, etc., as needed, to activate selected rows and columns of a selected RAM block based on a received access address in order to perform a read from or a write to the address location corresponding to the received access address.

Referring to write operations requested by a requestor of system 10 to memory 20, full writes are generally fast because a single write access cycle is needed to write the full width data size (and corresponding ECC check bits). However, in the case of a partial write (also referred to as a narrow write), a partial-width or narrow-width data size, less than the full-width data size, needs to be written to RAM blocks 28. For example, in the current example in which the full-width data size stored by RAM blocks 28 is 64 bits, a write of only 8 bits, 16 bits, or 32 bits is considered a partial write. Typically, for partial writes, as implemented in currently available systems, more clock cycles are needed as compared to a full write because of the necessity to use an atomic RMW sequence for the purpose of properly implementing ECC.

For example, for a typical partial write of 32 bits to an access address, first a read is performed to obtain 64 bits of read data from the access address, ECC is performed on the 64-bit read data to correct any single bit error (if needed), the corrected read data is modified to properly replace a portion of the read data with the desired partial write data, ECC check bits are then generated for the modified 64-bit read data, and lastly, the corrected and modified 64-bit read data with updated ECC code word are stored back to the access address. Only after the write back (i.e. the write of the RMW sequence) is the partial write considered complete with the provision of a response back to the requestor. This response typically includes an error response status, STAT, which indicates any ECC error. However, this approach negatively impacts write throughput because the requestor must wait until the response (STAT) is signaled by the memory controller before continuing with further transactions. Also, if an ECC error is flagged, for example, with the initial read of the RMW sequence, this ECC error is not communicated to the requestor until completion of the RMW sequence, resulting in an imprecise error flag to the requestor because it is unknown by the requestor when this ECC error was actually detected since completion of the RMW sequence can take many access cycles. That is, the error flag in this situation is imprecise because it is not flagged to the requestor at the time the error is detected.

Figure 3:
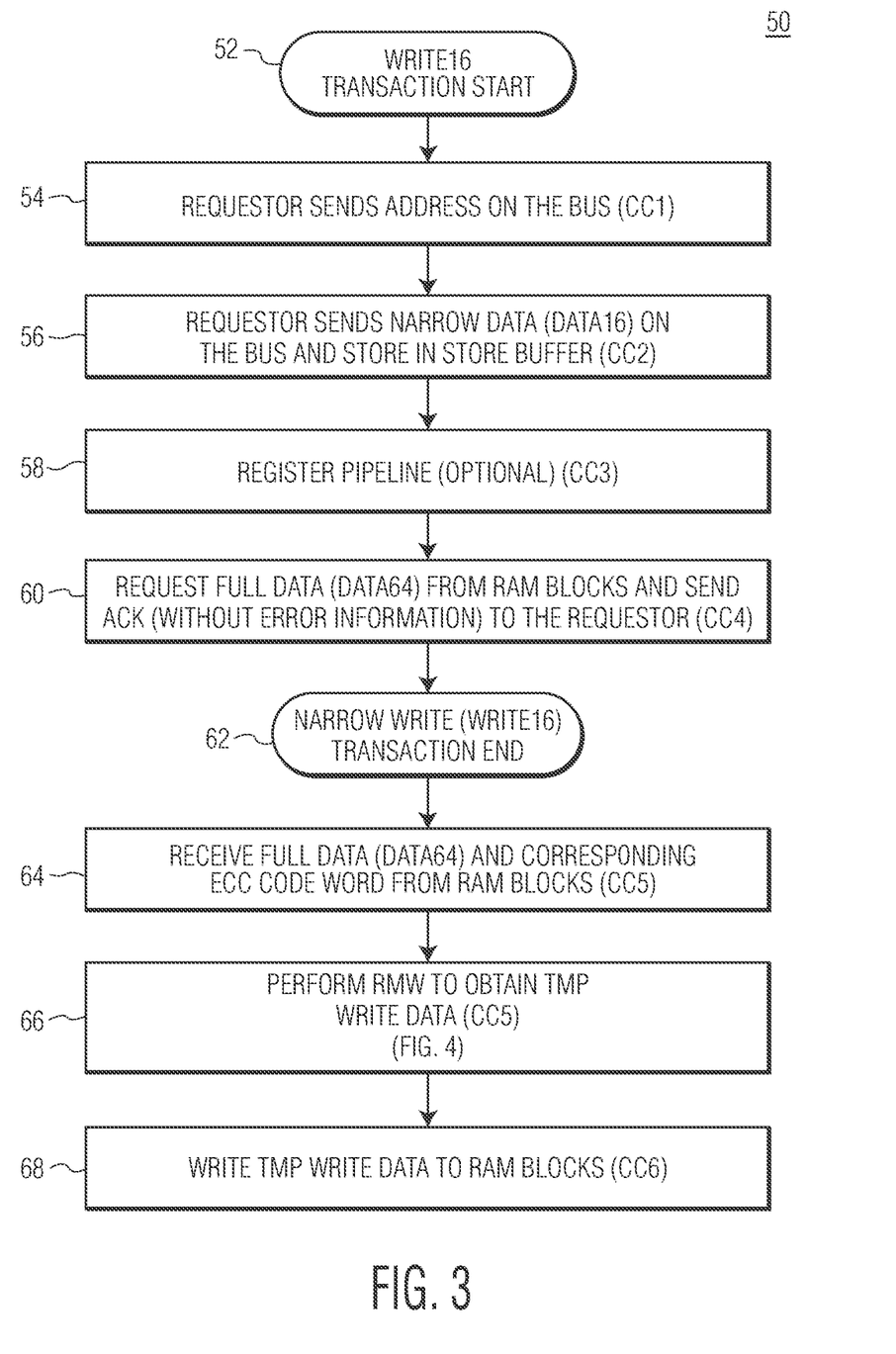
FIGS. 3 and 4 illustrate, in flow diagram form, a partial write operation implemented by the memory controller of FIG. 2, in accordance with one embodiment of the present invention.

As will be described in reference to the flow diagram of FIGS. 3 and 4, and the waveform of FIG. 5, one embodiment of the present invention terminates a partial write prior to completion of the RMW sequence in order to reduce latency of the partial write. Referring first to FIG. 3, FIG. 3 illustrates, in flow diagram form, a method 50 of performing a partial write operation in accordance with one embodiment of the present invention, which may be performed, for example, as a partial write to RAM blocks 28 by controller 26. FIG. 5 illustrates various waveforms or elements of memory 20 of FIG. 2, including a system clock referred to as "clk" in which each clock cycle corresponds to a high phase and a low phase of the clock signal, in which clock cycles 1-7 are labeled as CC1-CC7, respectively. In the illustrated embodiment, the partial write is performed as a partial write of 16 bits (referred to as a Write16 operation or transaction) as opposed to a full write of 64 bits. The Write16 operation begins at block 52 and will be described in conjunction with the waveforms of FIG. 5.

When the Write16 transaction begins, the requestor (e.g. any requestor or master in system 10), at block 54, sends an access address on system interconnect 12 (which may be referred to as the bus in the current embodiment) to controller 26 of memory 20. Next, at block 56, the requestor sends the 16-bit narrow write data (i.e. partial write data), which is referred to as Data16, on the bus to controller 26, which stores Data16 into store buffer 36. Referring to FIG. 5, blocks 54 and 56 correspond to the requestor placing ADR (the corresponding write access address of the Write16 operation) on the bus in CC1 and DATA (the corresponding write Data16 of the Write16 operation) on the bus in CC2. Referring back to FIG. 3, with Data16 in store buffer 36, Data16 can propagate through a register pipeline (if present) of store buffer 36, which may incur a wait state penalty cycle (indicated by arrow 86 in CC3 in FIG. 5). In this case, at block 60, controller 26 requests the full 64-bit data (Data64) from RAM blocks 28. As illustrated in FIG. 5, in CC4, controller 26 sends a read command (RD) to RAM blocks 28 and, in CC5, receives Data64 (DATA) from RAM blocks 28. In CC4, the same cycle in which the read command to RAM blocks 28 is sent, controller 26 sends a response on system interconnect 12 back to the requestor. In this case, the response is an acknowledge, ACK, which is provided without any error information. Since no error information is yet determined or provided, the ACK response is provided in response to DATA (as indicated by arrow 88) received at CC2, plus the wait state penalty of CC3, and need not wait for completion of any portion of the RMW sequence which implements the partial write. In this example, the requestor can then begin a new read or write transaction to controller 26 in CC5.

Note that in the case in which no register pipeline is present, Data16 is stored in store buffer 36 and there is no wait penalty required at CC3. In this case, the read command is provided to the RAM blocks in CC3 rather than CC4. In this case, ACK may be provided in CC3 rather than CC4 in response to receiving DATA from the requestor in CC2. Again, though, controller 26 need not wait for completion of any portion of the RMW sequence. In this example, the requestor can begin a new read or write transaction to controller 26 in CC4.

In this manner, after ACK (without ECC error information) is sent back to the requestor at block 60 of FIG. 3, the Write16 transaction is considered complete and thus ends at block 62. From a safety point of view, note that an error response is not required for full writes (64-bit writes) nor for partial writes (e.g. 8- or 32-bit writes) for a requestor because these write transactions, unlike read transactions from the requestor, do not return any data or code to be used immediately by the requestor. Therefore, as illustrated in the example of FIG. 5, the partial write response, ACK, can be provided in the same clock cycle as a full write response would be provided. Any errors which occur during the subsequent RMW sequence are tracked in error record 42 and can be signaled during a subsequent read transaction in response to a read request from a requestor, when needed data is actually returned to the requestor.

Referring back to FIG. 3, after the Write16 transaction ends, at block 64, the full data (Data64) as well as the corresponding ECC check bits (i.e. the corresponding ECC code word) is received by controller 26 from RAM blocks 28. For example, in CC5, Data64 and the ECC check bits are received and processed by error circuitry 40. A RMW sequence is performed at block 66 to implement the partial write (the Write16 transaction), as will be described in more detail in reference to the flow diagram of FIG. 4. Lastly, at block 68, the final write data (tmp write data) from the RMW sequence is written back to RAM blocks 28 from store buffer 36 in CC6.

Figure 4:
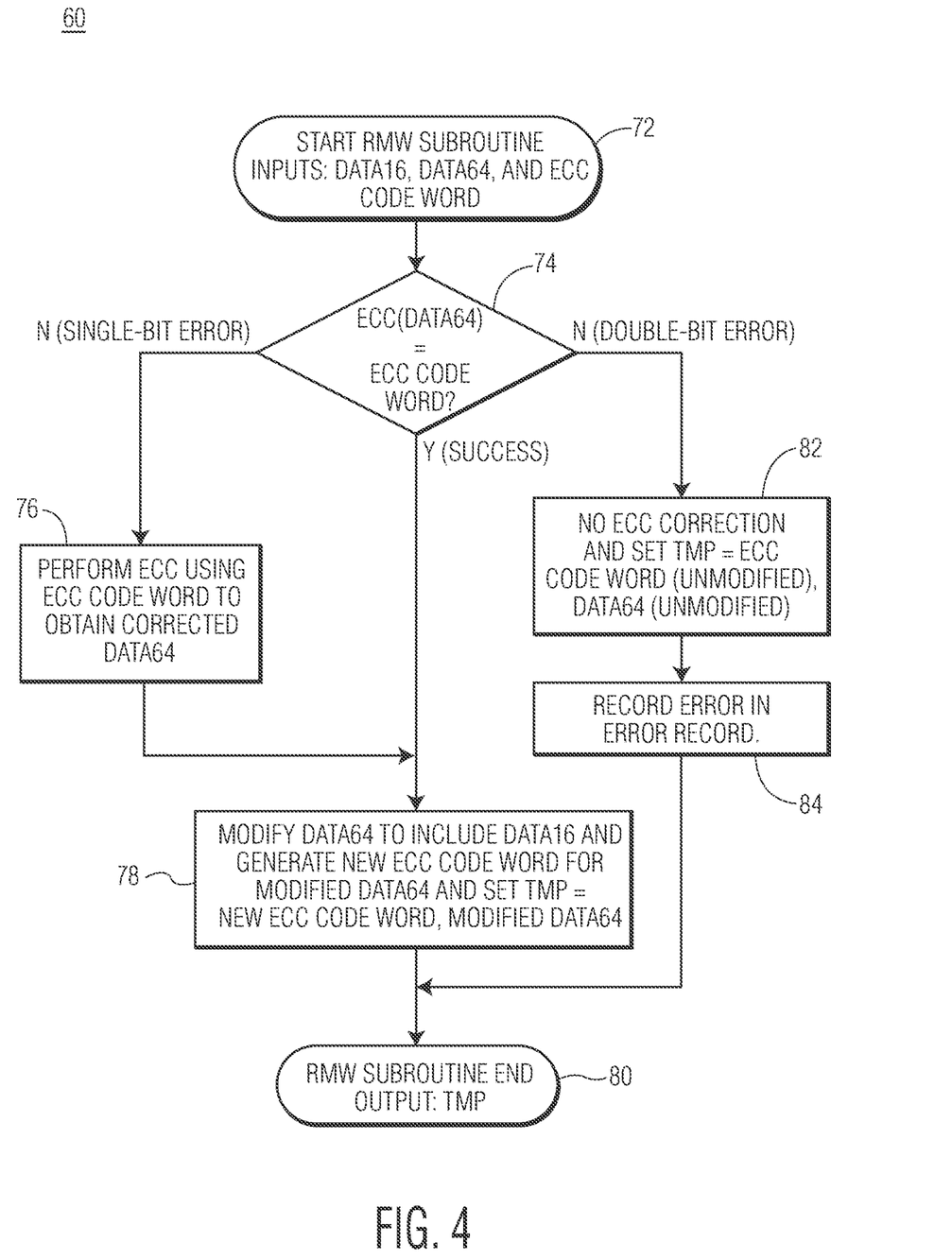
Figure 5:
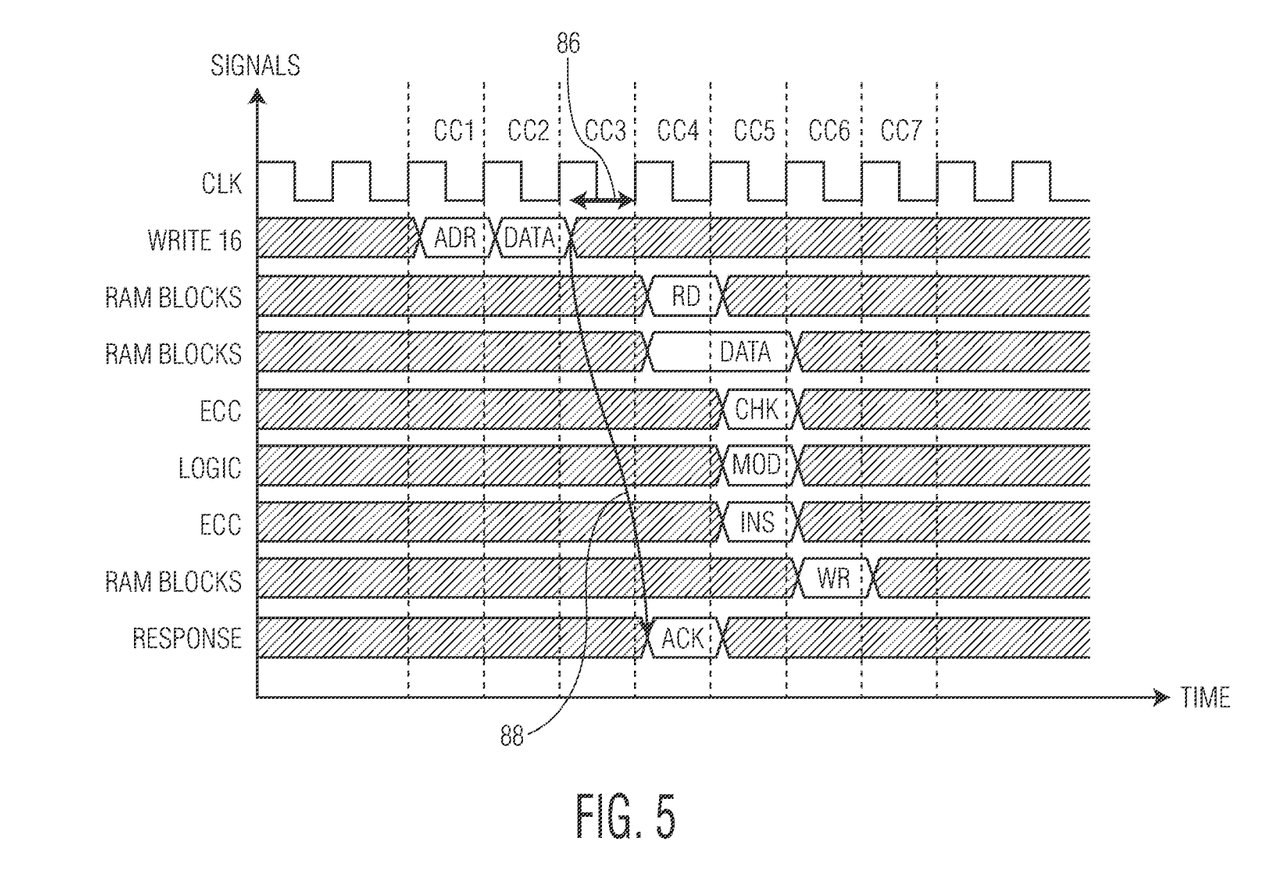
FIG. 5 illustrates waveforms of various signals of the memory controller of FIG. 2 corresponding to the flow diagram of FIGS. 3 and 4, in accordance with one embodiment of the present invention.

FIG. 4 illustrates a RMW sequence 66 executed by controller 26, in accordance with one embodiment of the present invention. At the start of RMW sequence 66 (also referred to as a RMW subroutine), controller 26 has received Data16 (from the requestor), Data64 (from a full read from RAM blocks 28), and the corresponding ECC code word (also read from RAM blocks 28). Each of Data16, Data64, and the corresponding ECC code word can be temporarily stored, as needed, in store buffer 36. ECC circuitry 40 performs an ECC check by generating ECC check bits for Data64, labeled as ECC (Data64), and comparing these generated ECC check bits against the corresponding ECC code word read from RAM blocks 28 (in which this ECC check is denoted by CHK in CC5 of FIG. 5). Therefore, at decision diamond 74, ECC circuitry 40 performs the ECC check to compare or check ECC (Data64) with the corresponding ECC code word, and if they match, success (i.e. no error) is indicated for the ECC check and the RMW sequence proceeds to block 78. However, if they do not match, an error is indicated for the ECC check. If a single-bit error is indicated, the error is correctable and RMW sequence 66 proceeds to block 76, but if a double-bit error is indicated, the error is not correctable and RMW sequence 66 proceeds to block 82.

Referring first to block 76, in the case of a single-bit error, the bit error can be corrected by ECC circuitry 40 performing ECC on Data64 using the corresponding ECC code word to generate the corrected version of Data64. At block 78, Data64 is modified to include Data16. For example, in one embodiment, logic within controller 26 (e.g. within read/write circuitry 38) can replace the appropriate 16-bit portion of Data64 with Data16, as known in the art. Note that Data64 of block 78 corresponds to the corrected version of Data64 in the case of a single-bit error or the original Data64 in the case of no error. After modifying Data64 to include Data16, ECC circuitry 40 generates corresponding ECC check bits (i.e. a new corresponding ECC code word) for the modified (and corrected) version of Data64. In one embodiment, the temporary value, tmp write data, is set to the new ECC code word in combination with the (corrected and) modified version of Data64. Note that the corrections and modifications to Data64 can be performed in store buffer 36, and thus the resulting tmp write data can also be stored in store buffer 36. At this point, RMW sequence 66 ends at block 80, in which the value of tmp write data corresponds to the final value to be written to RAM blocks 28 from store buffer 36 at the end of the RMW sequence to complete the write back portion of the partial write (at block 68 of FIG. 3). Note that the check of decision diamond 74 (CHK), modification of block 78 (MOD), and generation of new ECC code word for the new Data64 with Data16 inserted (INS) can all be done in CC5 of FIG. 5.

If a double-bit error is indicated at decision diamond 74, the error is unrecoverable. Therefore, at block 82, no ECC correction is performed and tmp write data is simply set to the original unmodified corresponding ECC code word (which was read with Data64) in combination with the original unmodified Data64. At block 84, the unrecoverable error (e.g. the write address of the error) is recorded in error record 42, and the RMW sequence ends at block 80. In this case, the same value (the original values of Data64 and the corresponding ECC code word) are again stored back to RAM blocks 28. Rewriting the original data to RAM blocks 28 ensures that the error will be signaled during the next read transaction. Alternatively, though, the values may not be rewritten but are instead left unmodified in RAM blocks 28. Note that uncorrectable or unrecoverable errors which lead to block 82 of FIG. 4 can be double-bit or multiple-bit errors or any other type of uncorrectable errors (such as complete functional failures of the memories).

Referring back to the waveforms of FIG. 5, controller 26 therefore terminates the partial write transaction in CC4 with the ACK response to the requestor as compared with a controller which implements typical partial writes in which the partial write would not end until CC6 after the modified Data64 is written back to the RAM blocks. After early termination of the partial write in CC4, the requestor is allowed to proceed to other transactions (for example, in CC5). Note that, in this embodiment, the requestor is allowed to proceed with other transactions even if the final write back of the RMW sequence to RAM blocks 28 has not yet been performed.

Figure 6:
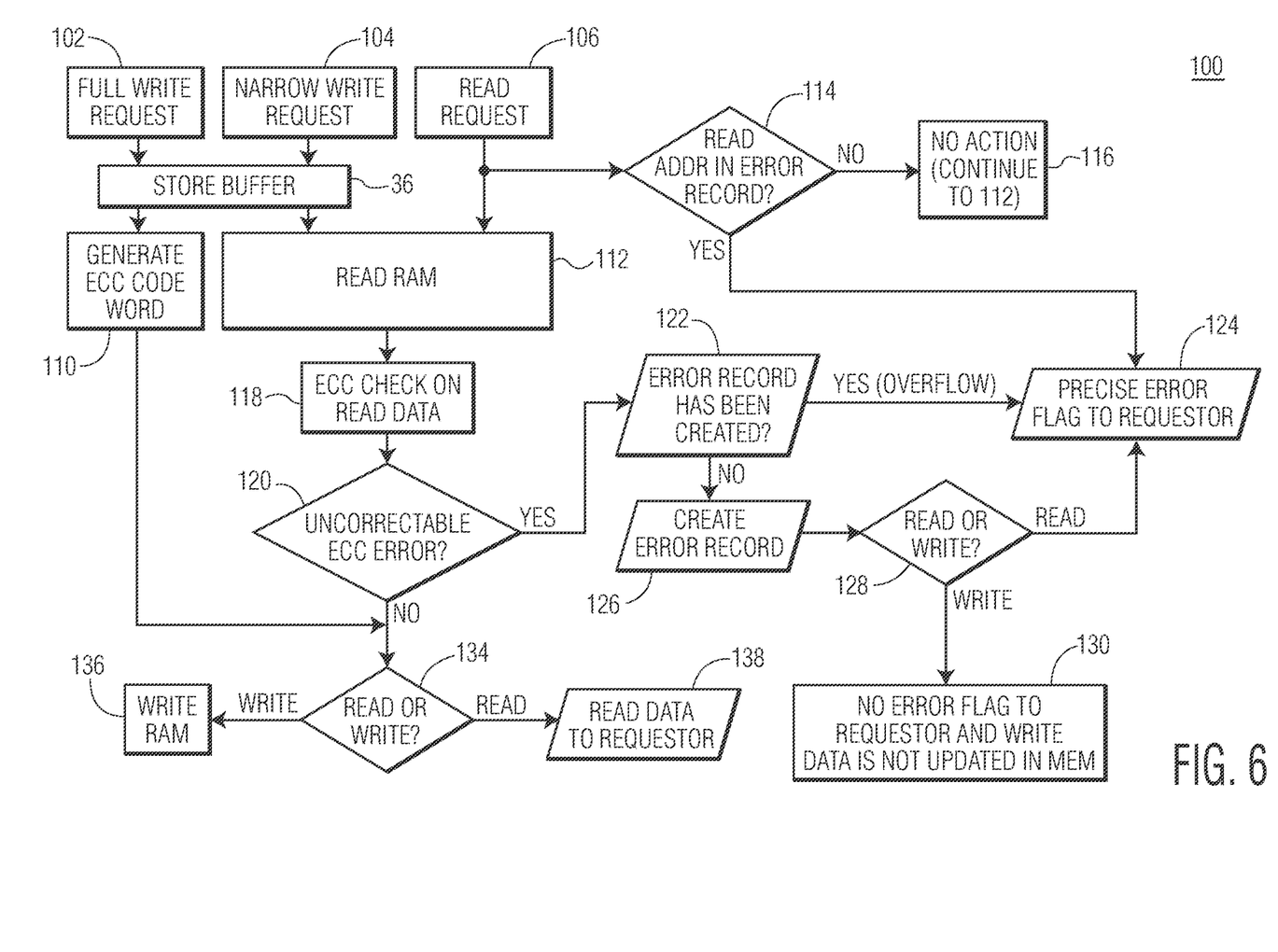
FIG. 6 illustrates, in flow diagram form, error handling within the memory controller of FIG. 2, in accordance with one embodiment of the present invention.

FIG. 6 illustrates, in flow diagram form, an error handling method 100 within controller 26, in accordance with one embodiment of the present invention. Beginning with block 102, 104, or 106, an access request to memory 20 (i.e. to RAM blocks 28) is received from a requestor in system 10. Block 102 corresponds to receiving a full write access request, block 104 corresponds to receiving a narrow write access request (i.e. a partial write access request), and block 106 corresponds to receiving a read access request. Each request also includes a corresponding access address of RAM blocks 28, and each write request also includes corresponding write data (either full write data or partial write data). Note that additional signals, such as control signals, may also be provided with each access request, in which these control signals may also be used by read/write circuitry 38, as needed, for performing the read or write accesses.

In the case of a read request received at block 106, read/write circuitry 38, at decision diamond 114, determines whether or not the read access address is stored in error record 42. If so, then the read access address stores data with an uncorrectable or unrecoverable error, and method 100 proceeds to block 124 in which a precise error is flagged (indicated) to the requestor. This error is considered precise because it is flagged at the time the error is determined (upon the read access of the data having the error). Upon flagging the error, the read may still continue at block 112 or may end. If, at decision diamond 114, the read access address is not in error record 42, method 100 proceeds to block 112, in which read/write circuitry 38 performs a read from the RAM (from RAM blocks 28) to obtain 64 bits of read data, (e.g. read Data64), and a corresponding ECC code word (e.g. an 8-bit code word).

At block 118, ECC circuitry 40 performs an ECC check on the read data (e.g. read Data64) by generating ECC check bits using read Data64 and comparing the generated ECC check bits to the received corresponding ECC code word to determine if an error is present in read Data64. If, at decision diamond 120, it is determined that read Data64 does not include an error or includes a correctable error (e.g. a one-bit error), method 100 proceeds to decision diamond 134. In the current case, in which a read access request was received at block 106, method 100 proceeds from decision diamond 134 to block 138 in which the read data (read Data64 or corrected read Data64, if ECC circuitry 40 detected and corrected a correctable error) is provided back to the requestor via system interconnect 12.

In the case of a full write request received at block 102, the corresponding write data (e.g. write Data64) provided with the full write request is stored into store buffer 36 at block 108. Next, at block 110, ECC circuitry 40 generates the corresponding check bits (the corresponding 8-bit ECC code word), which can also be temporarily stored in store buffer 108, and proceeds to decision diamond 134. In the current case, in which a full write access request was received at block 102 from a requestor of system 10, method 100 proceeds to block 136 in which the write data (write Data64), along with its corresponding ECC code word, is written (i.e. stored) into RAM blocks 28.

In the case of a narrow or partial write request received at block 104, though, the partial write data (e.g. write Data16) from the requestor is stored in store buffer 36. At this point, a RMW sequence begins, in which a read is first performed at block 112. A read of a full 64 bits of data (read Data64) is first performed at block 112, in which the read Data64 is received with its corresponding ECC code word. As described above, ECC circuitry 40 performs an ECC check on read Data64 to determine if the generated ECC check bits match the corresponding ECC code word. If there is no uncorrectable error, the RMW proceeds as was already described above (e.g. in FIG. 4) with the corrected version of Data64. However, if ECC circuitry 40 determines that there is an uncorrectable ECC error (e.g. a double-bit or multiple-bit error), then, at block 122, ECC circuitry 40 determines whether or not an error record has been created. In one embodiment, error record 42 is configured to store only one uncorrectable error (e.g. to store the address of only one uncorrectable error). Therefore, if error record 42 has already been created, it already stores one uncorrectable error and cannot store more. In this case, an overflow is indicated with error record 42 and a precise error is flagged back to the requestor. Note that this error flag is indicated due to an ECC error which was previously detected and stored into error record 42. The RMW also ends at this point since an uncorrectable error has occurred and cannot be tracked in the error record. If an uncorrectable ECC error is determined and an error record has not yet been created, then, at block 126, an error record is created (e.g. by storing the uncorrectable error in error record 42).

Note that the same process occurs at decision diamond 120 in the case of performing a read access in response to a received read access request from a requestor. That is, if the ECC check on the read Data64 obtained in response to a read access request (received at block 106 from a requestor of system 10) or obtained in response to the read of a RMW sequence for a partial write determines an uncorrectable error, method 100 proceeds to block 122, as was described above. Therefore, after error record 42 is created at block 126, method 100 determines whether the uncorrectable error was identified during a read access in response to a read access request from a requestor or during a read access for a RMW sequence in response to a partial write access request. In the former case, method 100 proceeds to block 124 in which a precise error is flagged back to the requestor. However, in the latter case, in which a write is the next step in the RMW sequence, method 100 proceeds to block 130. Therefore, note that decision diamond 128 queries whether a read from a requestor is being processed (and thus proceeds to block 124) or a read into store buffer 36 as part of a RMW for a partial write is being processed (and thus proceeds to block 130). However, at block 130, no error is flagged or indicated to the requestor. Also, as was described above with respect to FIG. 4, the write data is not updated in RAM blocks 28 (i.e. is not written back to RAM blocks 28). In this case, note that, as described above with respect to FIG. 3, the partial write is terminated after the partial write data Data16 is stored in store buffer 36. This can be done, for example, by sending the ACK back to the requestor, but no corresponding error status is sent with the ACK.

Note that in alternate embodiments, error record 42 may be configured to store N errors, in which case, at block 122, it is determined whether error record 42 has space for an additional error to be stored. If not, then method 100 would proceed to block 124 due to an overflow condition of the error record. If the error record has not been created or if the error record has space for an additional error, then method 100 would also proceed from block 122 to block 126 in which the error is stored in error record 42 (in this example, error record 42 can be created if the error is the first error, or the error can simply be added to the already-created error record 42).

Therefore, by now it can be understood how improved latency on partial writes may be achieved by, for example, terminating the partial writes after storing the partial write data in a store buffer, but prior to performing any writes to the RAM blocks or memory array for the RMW sequence of the partial write. In this case, termination of the partial write results in sending an acknowledgement (e.g. ACK) of the termination to the requestor, but no error information is provided at that time. The requestor can then continue with other transactions. In this manner, even if an error is detected while performing the RMW in response to the partial write, it is not flagged to the requestor at the time the error is detected so as not to result in an imprecise error (since the error may occur many clock cycles after the initial partial write request is received by the memory, e.g. during the RMW sequence, making it difficult to correlate the error with the partial write request). However, the error is tracked by storing the address of the error (of the uncorrectable data) in an error record such that, upon any subsequent read access of the erroneous data location, when the read data is actually needed by the requestor, the error can be properly flagged. In this case, the error is precisely flagged, as it is flagged at the time the read request attempts to access the uncorrectable data.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 1 and 2 and the discussion thereof describe exemplary information processing architectures, these exemplary architectures are presented merely to provide a useful reference in discussing various aspects of the invention. Of course, the description of the architectures has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of system 10 are circuitry located on a single integrated circuit or within a same device. Alternatively, system 10 may include additional integrated circuits or separate devices interconnected with each other. For example, an external memory may be located on a separate integrated circuit or located within another peripheral or responder discretely separate from other elements of system 10. One or more peripherals may also be located on separate integrated circuits or devices.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention. Note that any of the aspects below can be used in any combination with each other and with any of the disclosed embodiments.

In one embodiment, a data processing system includes a system interconnect; a requestor coupled to the system interconnect and configured to provide read access requests, full write access requests with corresponding full write data each having a full-width data size, and partial write access requests with corresponding partial write data each having a partial-width data size, smaller than the full-width data size, onto the system interconnect; and a memory. The memory includes a memory array configured to store write data and corresponding error correction code (ECC) check bits for the write data in response to write access requests and to provide read data and corresponding ECC check bits for the read data in response to read access requests; a store buffer, external to the memory array; and a memory controller configured to execute a read-modify-write (RMW) sequence between the store buffer and the memory array to implement a partial write transaction in response to a partial write access request, wherein the memory controller is configured to store the partial write data into the store buffer upon receiving the partial write access request and suppress signaling of ECC errors to the requestor during the RMW sequence. In one aspect of the embodiment, the memory controller is configured to terminate the partial write transaction in response to storing the partial write data into the store buffer by sending an acknowledge signal without any error status information to the requestor. In a further aspect, the acknowledge signal without any error status information is sent to the requestor prior to completion of the RMW sequence. In another aspect of the embodiment, the memory controller is configured to, during execution of the RMW sequence, request read data of the full-width data size from an access address of the partial write access request from the memory array and perform an ECC check on the requested read data of the full-width data size using corresponding ECC check bits received with the read data of the full-width data size. In a further aspect, the memory controller further includes an error record, wherein the memory controller is further configured to, when the ECC check on the requested read data of the full-width data size indicates an uncorrectable error, store the access address of the partial write access request into the error record. In yet a further aspect, the memory controller is further configured to, in response to each of the read access requests provided by the requestor onto the system interconnect, determine whether an access address of the provided read access request is present in the error record. In yet an even further aspect, the memory controller is further configured to, when the memory controller determines that the access address of the provided read access request is present in the error record, signal an ECC error to the requestor. In another further aspect, the uncorrectable error corresponds to a multiple bit error detected during the ECC check. In another aspect of the embodiment, the memory controller further includes an error record, and the memory controller is further configured to, when an ECC error is detected during execution of the RMW and the error record has not yet stored its maximum number of ECC errors, store an access address of the partial write access request into the error record but not provide any ECC error indication of the ECC error to the requestor. In a further aspect, the memory controller is further configured to, when a read access request is received on the system interconnect from the requestor, in response to determining that an access address of the received read access request is present in the error record, indicating the ECC error to the requestor. In another further aspect, when the ECC error is detected during execution of the RMW and the error record has already stored its maximum number of ECC errors, indicate an ECC overflow error indicator to the requestor.

In another embodiment, in a data processing system having a requestor and a memory including a memory array, a store buffer, and a memory controller, a method includes receiving, by the memory controller, a full write access request from the requestor with corresponding full write data, and in response thereto, the memory controller storing the full write data and corresponding error correction code (ECC) check bits for the write data into the memory array; receiving, by the memory controller, a partial write access request from the requestor with corresponding partial write data for a partial write transaction, wherein a data size of the partial write data is smaller than a data size of the full write data; in response to the partial write access request, storing the partial write data into the store buffer and providing an acknowledge to the requestor to terminate the partial write transaction, wherein the acknowledge is provided to the requestor without any error status information to the requestor; and, after terminating the partial write transaction, completing a read-modify-write (RMW) sequence between the store buffer and the memory array to implement the partial write transaction in response to the partial write access request. In one aspect of the another embodiment, the method further includes, while the RMW sequence is being performed, the requestor initiating another read or write transaction subsequent to the partial write transaction. In another aspect, completing the RMW sequence between the store buffer and the memory array includes requesting read data of the full-width data size from an access address of the partial write access request from the memory array and performing an ECC check on the requested read data of the full-width data size using corresponding ECC check bits received with the read data of the full-width data size. In a further aspect, completing the RMW sequence between the store buffer and the memory array further includes, when the ECC check on the requested read data of the full-width data size indicates an uncorrectable error, storing the access address of the partial write access request into the error record but not provide any ECC error indication of the uncorrectable error to the requestor. In yet a further aspect, the method further includes receiving, by the memory controller, a read request from the requestor; determining whether an access address of the read request from the requestor is present in the error record; and, when the access address of the read request from the requestor is present in the error record, signaling an ECC error to the requestor. In another further aspect, the uncorrectable error corresponds to a multiple bit error detected during the ECC check. In another further aspect, completing the RMW sequence between the store buffer and the memory array further includes modifying the read data of the full-width data size with the partial write data in the stored buffer; generating ECC check bits for the modified read data; and storing the modified read data and the ECC check bits for the modified read data to the memory array. In yet another aspect of the another embodiment, the method further includes, when an ECC error is detected during execution of the RMW and the error record has not yet stored its maximum number of ECC errors, storing an access address of the partial write access request into the error record without providing any ECC error indication of the ECC error to the requestor. In a further aspect, the method further includes, when a read access request is received from the requestor, in response to determining that an access address of the received read access request is present in the error record, indicating an ECC overflow error to the requestor.

What is claimed is:

1. A data processing system, comprising:
   a system interconnect;
   a requestor coupled to the system interconnect and configured to provide read access requests, full write access requests with corresponding full write data each having a full-width data size, and partial write access requests with corresponding partial write data each having a partial-width data size, smaller than the full-width data size, onto the system interconnect; and
   a memory comprising:
      a memory array configured to store write data and corresponding error correction code (ECC) check bits for the write data in response to write access requests and to provide read data and corresponding ECC check bits for the read data in response to read access requests;
      a store buffer, external to the memory array; and
      a memory controller configured to execute a read-modify-write (RMW) sequence between the store buffer and the memory array to implement a partial write transaction in response to a partial write access request, wherein the memory controller is configured to store the partial write data into the store buffer upon receiving the partial write access request and suppress signaling of ECC errors to the requestor during the RMW sequence.

2. The data processing system of claim 1, wherein the memory controller is configured to terminate the partial write transaction in response to storing the partial write data into the store buffer by sending an acknowledge signal without any error status information to the requestor.

3. The data processing system of claim 2, wherein the acknowledge signal without any error status information is sent to the requestor prior to completion of the RMW sequence.

4. The data processing system of claim 1, wherein the memory controller is configured to, during execution of the RMW sequence, request read data of the full-width data size from an access address of the partial write access request from the memory array and perform an ECC check on the requested read data of the full-width data size using corresponding ECC check bits received with the read data of the full-width data size.

5. The data processing system of claim 4, wherein the memory controller further includes an error record, wherein the memory controller is further configured to, when the ECC check on the requested read data of the full-width data size indicates an uncorrectable error, store the access address of the partial write access request into the error record.

6. The data processing system of claim 5, wherein the memory controller is further configured to, in response to each of the read access requests provided by the requestor onto the system interconnect, determine whether an access address of the provided read access request is present in the error record.

7. The data processing system of claim 6, wherein the memory controller is further configured to, when the memory controller determines that the access address of the provided read access request is present in the error record, signal an ECC error to the requestor.

8. The data processing system of claim 5, wherein the uncorrectable error corresponds to a multiple bit error detected during the ECC check.

9. The data processing system of claim 1, wherein the memory controller further comprises an error record, and the memory controller is further configured to:
   when an ECC error is detected during execution of the RMW and the error record has not yet stored its maximum number of ECC errors, store an access address of the partial write access request into the error record but not provide any ECC error indication of the ECC error to the requestor.

10. The data processing system of claim 9, wherein the memory controller is further configured to:
   when a read access request is received on the system interconnect from the requestor, in response to determining that an access address of the received read access request is present in the error record, indicating the ECC error to the requestor.

11. The data processing system of claim 9, wherein:
   when the ECC error is detected during execution of the RMW and the error record has already stored its maximum number of ECC errors, indicate an ECC overflow error indicator to the requestor.

12. In a data processing system having a requestor and a memory including a memory array, a store buffer, and a memory controller, a method comprising:
   receiving, by the memory controller, a full write access request from the requestor with corresponding full write data, and in response thereto, the memory controller storing the full write data and corresponding error correction code (ECC) check bits for the write data into the memory array;
   receiving, by the memory controller, a partial write access request from the requestor with corresponding partial write data for a partial write transaction, wherein a data size of the partial write data is smaller than a data size of the full write data;
   in response to the partial write access request, storing the partial write data into the store buffer and providing an acknowledge to the requestor to terminate the partial write transaction, wherein the acknowledge is provided to the requestor without any error status information to the requestor; and
   after terminating the partial write transaction, completing a read-modify-write (RMW) sequence between the store buffer and the memory array to implement the partial write transaction in response to the partial write access request.

13. The method of claim 12, further comprising:
   while the RMW sequence is being performed, the requestor initiating another read or write transaction subsequent to the partial write transaction.

14. The method of claim 12, wherein completing the RMW sequence between the store buffer and the memory array comprises:
   requesting read data of the full-width data size from an access address of the partial write access request from the memory array and performing an ECC check on the requested read data of the full-width data size using corresponding ECC check bits received with the read data of the full-width data size.

15. The method of claim 14, wherein completing the RMW sequence between the store buffer and the memory array further comprises:

when the ECC check on the requested read data of the full-width data size indicates an uncorrectable error, storing the access address of the partial write access request into the error record but not provide any ECC error indication of the uncorrectable error to the requestor.

16. The method of claim 15, further comprising:
receiving, by the memory controller, a read request from the requestor;
determining whether an access address of the read request from the requestor is present in the error record; and
when the access address of the read request from the requestor is present in the error record, signaling an ECC error to the requestor.

17. The method of claim 15, wherein the uncorrectable error corresponds to a multiple bit error detected during the ECC check.

18. The method of claim 14, wherein completing the RMW sequence between the store buffer and the memory array further comprises:

modifying the read data of the full-width data size with the partial write data in the stored buffer;
generating ECC check bits for the modified read data; and
storing the modified read data and the ECC check bits for the modified read data to the memory array.

19. The method of claim 12, further comprising:
when an ECC error is detected during execution of the RMW and the error record has not yet stored its maximum number of ECC errors, storing an access address of the partial write access request into the error record without providing any ECC error indication of the ECC error to the requestor.

20. The method of claim 19, further comprising:
when a read access request is received from the requestor, in response to determining that an access address of the received read access request is present in the error record, indicating an ECC overflow error to the requestor.

* * * * *